BEST AVAILABLE COPY

T 857,032

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

857 O.G. 696

683,112

DISAZO COMPOUNDS CONTAINING A DICARBOXIMIDO GROUP

Max A. Weaver and James M. Straley, both % Tennessee Eastman Company, P.O. Box 511, Kingsport, Tenn. 37662

Filed Nov. 15, 1967. Published Dec. 17, 1968

Class 8—41

No Drawing. 16 Pages Specification

Disazo compounds containing a dicarboximido group bonded to a nuclear carbon atom of a benzene diazo component and having a phenolic coupling component are useful as dyes for hydrophobic textile materials.